US006619750B2

United States Patent
Toyota et al.

(10) Patent No.: US 6,619,750 B2
(45) Date of Patent: Sep. 16, 2003

(54) SEAT CUSHION FRAME FOR VEHICLE SEAT

(75) Inventors: Ikuo Toyota, Tokyo (JP); Maasaki Yokota, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/895,420

(22) Filed: Jul. 2, 2001

(65) Prior Publication Data

US 2003/0001422 A1 Jan. 2, 2003

(51) Int. Cl.[7] .............................................. A47C 7/02
(52) U.S. Cl. .................................. 297/452.18; 248/429
(58) Field of Search ........................ 297/452.1, 452.18, 297/452.2, 344.1, 463.1; 248/429, 430

(56) References Cited

U.S. PATENT DOCUMENTS

| 4,673,215 | A | * | 6/1987 | Yokoyama | 297/452.18 |
| 5,575,533 | A | * | 11/1996 | Glance | 297/452.2 |
| 5,636,901 | A | * | 6/1997 | Grilliot et al. | 297/452.18 |
| 5,746,476 | A | * | 5/1998 | Novak et al. | 297/216.13 |
| 5,897,168 | A | | 4/1999 | Bartelt et al. | |
| 5,909,926 | A | * | 6/1999 | Gonzalez | 297/354.12 |
| 6,045,186 | A | * | 4/2000 | Butt et al. | 297/296 |

* cited by examiner

Primary Examiner—Peter M. Cuomo
Assistant Examiner—Stephen Vu
(74) Attorney, Agent, or Firm—Browdy and Neimark, P.L.L.C.

(57) ABSTRACT

A die-cast seat cushion frame is provided for a vehicle seat, which has connecting portions defined integrally in its two lateral frame portions. The connecting portions are adapted for connection with a slide rail device, wherein a cross beam portion is so extended between the two lateral frame portions that two ends of the cross beam portion are integrally connected with the two lateral frame portions, respectively, at points corresponding to the connecting portions. This provision of cross beam portion not only renders the seat cushion frame much robust and light in weight, but also serves to receive a seat occupant's buttocks portion against its undesired forward sliding or slippage on a seat cushion in a sudden deceleration or collision case.

20 Claims, 3 Drawing Sheets

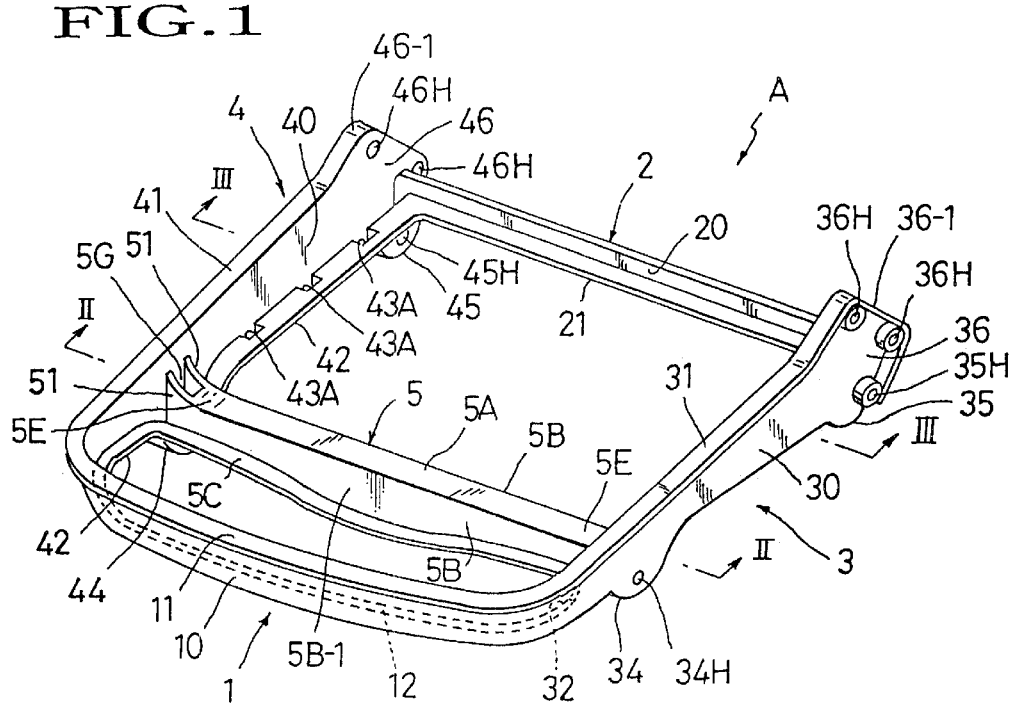

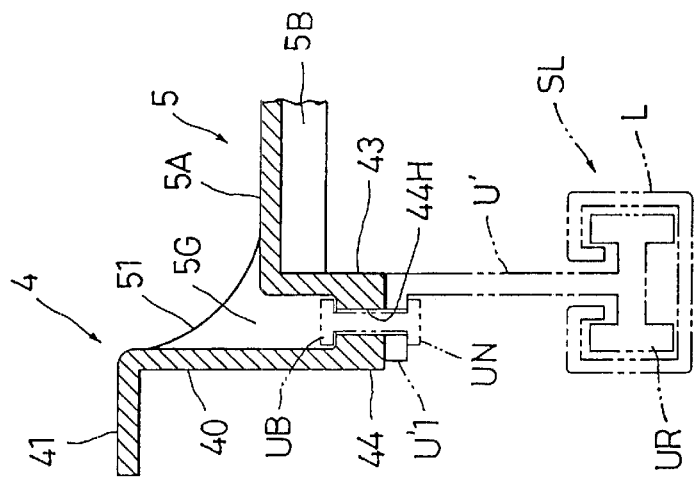
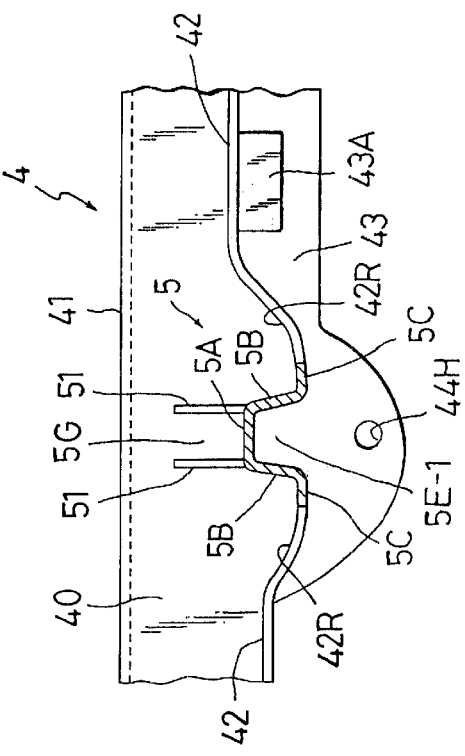
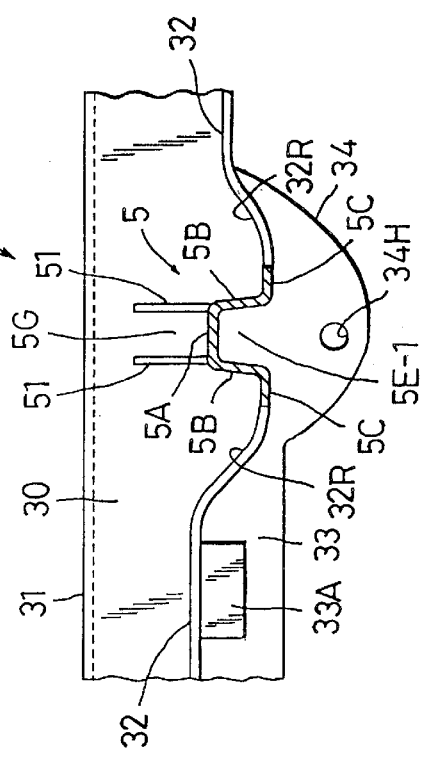

SEAT CUSHION FRAME FOR VEHICLE SEAT

BACKGROUND OF INVENTION

1. Field of the Invention

The present invention relates to a seat cushion frame for use in a vehicle seat, and particularly to a die-cast seat cushion frame having a reinforced structure.

2. Description of Prior Art

A vehicle seat has a seat frame as a main supportive skeleton. Recently, the seat frame has been made light in weight by being formed from a light alloy such as aluminum alloy or magnesium alloy.

Typically, as disclosed from the U.S. Pat. No. 5,897,168 for instance, a seat frame is formed by die casting, using a magnesium alloy, into a predetermined quadrangular seat frame configuration, which therefore makes forming seat frame easy and rapid.

This sort of die-cast frame is, however, reduced in rigidity and robust in comparison with a steel frame assembly formed by firmly fastening several steel plate pieces to one another. To compensate for this disadvantage, it has been a common practice to attach a steel reinforcing plate to the vulnerable points of die-cast frame which are susceptible to a great load and prone to deformation thereby. Particularly, in the case where a pair of steel slide rails are fixedly connected with the respective two lateral frame sections of a die-cast seat cushion frame, there are normally defined forward and rearward connecting points in each of the two lateral frame sections for firm connection with the respective two slide rails. Then, those two connecting points naturally require additional reinforcements in view of the afore-said less robustness of die-cast frame. For that purpose, conventionally, a reinforcement plate has been attached to each of the connecting points of die-cast seat cushion frame together with the slide rails, sufficient to withstand an intensive exertion of great load thereon. Or, in alternative conventional way, each of those connecting points has been formed to increase its thickness to a considerable degree during die casting process so as to give a sufficient strength thereto.

But, in both such reinforcing effects, the weight of die-cast frame itself becomes increased to impair the lightweight purpose and costs of material also increase due to a greater amount of aluminum or magnesium alloy used. Further, there has been no particular design in the seat cushion frame to receive a seat occupant's buttocks portion in the case of a sudden deceleration or collisions case so as to prevent the occupant's buttocks portion from being moved downwards below the seat cushion frame via a cushiony upholstery layer on the frame and slid forwards on the surface of upholstery, passing through a seat belt on his or her body into an undesired state.

SUMMARY OF THE INVENTION

In view of the above-stated drawbacks, it is a purpose of the present invention to provide an improved die-cast seat cushion frame for vehicle seat which is of a light yet robust construction and serves to prevent forward slippage of a seat occupant's buttocks portion relative to the seat cushion frame.

To achieve such purpose, a die-cast seat cushion frame for seat cushion of vehicle seat in accordance with the present invention is basically comprised of:

- a forward frame portion defined forwardly thereof;
- a rearward frame portion defined rearwardly thereof;
- a pair of lateral frame portion defined between the forward and rearward frame portions;
- at least two connecting portions integrally formed in each of those two lateral frame sections; which at least two connecting portions are adapted for connection with a slide rail means; and
- a cross beam portion extended integrally between the two lateral frame sections in such a manner that one end of the cross beam section is disposed at a point corresponding to one of the at least two connecting portions while another end of the cross beam section is disposed at a point corresponding to another of the at least two connecting potions.

Accordingly, such simple provision of the cross beam portion does not require any separate reinforcing elements and neither do it require unnecessary increase of thickened portions in the seat cushion frame, either. This is much effective to the die-cast seat cushion formed from such light alloy as magnesium or aluminum alloy. Further, since the cross beam portion is disposed transversely of the seat cushion frame, a buttocks portion of an occupant on a seat cushion (i.e. the seat cushion frame) will be positively received by that cross beam portion when the buttock portion is sunk greatly below the seat cushion frame in a sudden deceleration and collision case, thereby protecting the occupant from the above-stated forward slippage problem.

Preferably, the cross beam portion is of generally inverted-U-shaped configuration in cross-section and both ends thereof are integrally connected via gusset portions with the respective inner walls of the two lateral frame portions.

It is another purpose of the present invention to reinforce the two lateral frame portions without increase of their respective thicknesses. For that purpose, a generally U-shaped beam portion is defined in and along the inner wall of each of the two lateral frame portion. Additionally, an upper flange portion is formed in the upper end of each lateral frame portion, projecting outwardly therefrom, and a lower flange portion is formed in the lower end of each lateral frame portion, projecting inwardly therefrom.

It is still another purpose of the invention to make more rigid the foregoing connecting portions to efficiently disperse a load applied thereto and escape therethrough to the slide rail means. For that purpose, the connecting portions are large in thickness relative to the lateral frame portions and so formed that the outer walls thereof are coplanar with the outer vertical surfaces of the lateral frame portions.

Other various features and advantages of the present invention will become apparent from reading of the descriptions hereinafter with reference to the annexed drawings.

BRIEF DESCRIPTION OF THE DRAWINGS

FIG. 1 is a schematic perspective view of a die-cast seat cushion frame in accordance with the present invention;

FIG. 2 is a sectional view taken along the line II—II in FIG. 1;

FIG. 6 is a fragmentary sectional view taken along the line VI—VI in FIG. 2;

FIG. 7 is a fragmentary sectional view taken along the line VII—VII in FIG. 2; and FIG. 8 is a partially enlarged sectional view showing an alternative mode of a left forward thickened connecting portion of the seat cushion frame.

DETAILED DESCRIPTION OF PREFERRED EMBODIMENTS OF THE INVENTION

Referring to FIGS. 1 through 6, there are illustrated exemplary modes of die-cast seat cushion frame in accordance with the present invention.

FIG. 1 shows, in the perspective, a whole appearance of seat cushion frame, as generally designated by (A), in accordance with the present invention. By subjecting aluminum or magnesium alloy material to a die casting process, using proper dies (not shown), the seat cushion frame (A) is formed generally in the illustrated quadrangular configuration. Namely, the die-cast frame (A) is basically comprised of a forward frame portion (1), a rearward frame portion (2), a pair of lateral frame portions (3) (4), and a cross beam portion (5). All those portions are formed integrally together as shown. Of course, the frame (A) is to be covered with an upholstery (not shown) (which typically comprises a trim cover assembly and foam cushion member, for instance) to form a seat cushion of a vehicle or automotive seat (not shown) for supporting the buttocks and thigh portion of an occupant on the seat cushion.

Figure 3:
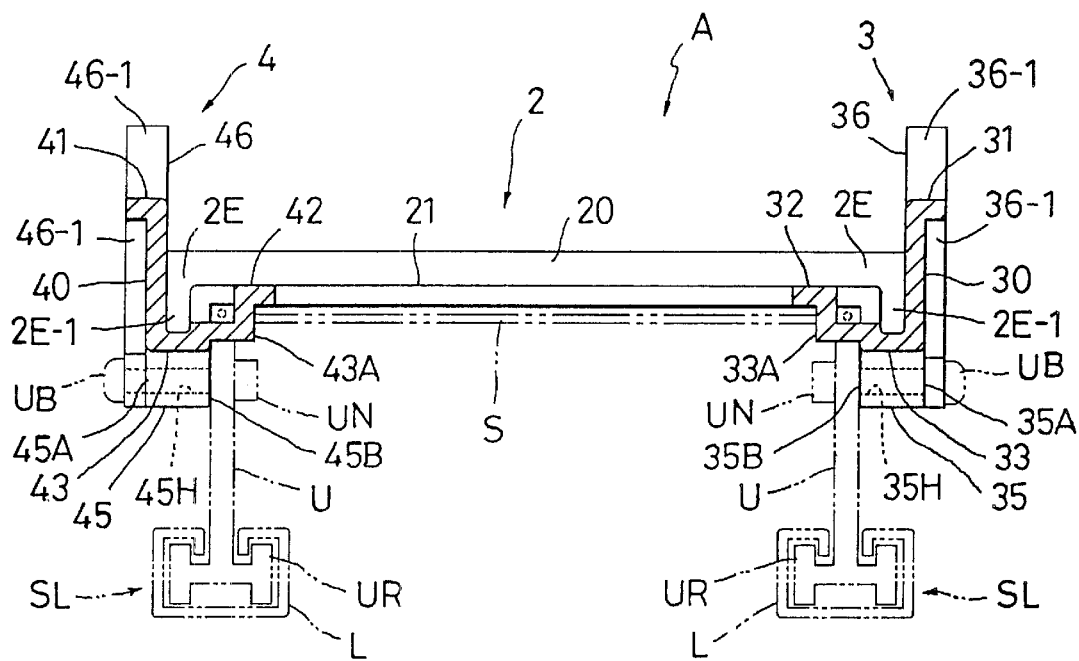
FIG. 3 is a sectional view taken along the line III—III in FIG. 1.
Figure 5:
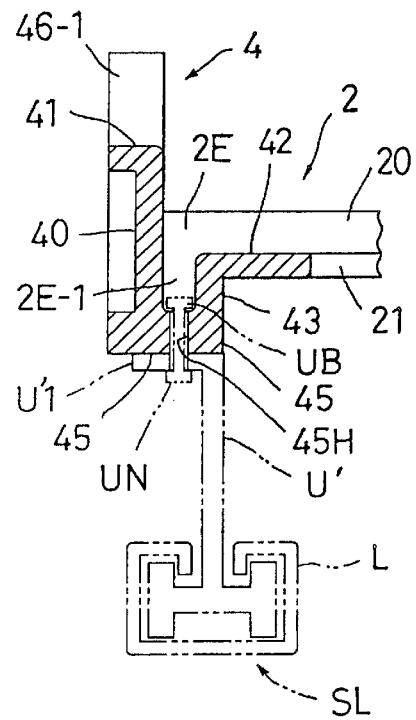
FIG. 5 is a partially enlarged sectional view showing an alternative mode of a left rearward thickened connecting portion of the seat cushion frame.

As viewed from FIGS. 1 and 3, integrally defined in the left lateral frame portion (4) are a vertical main body (40), an outwardly projected upper flange (41), and an inwardly projected lower flange (42). The upper flange (41) projects horizontally and continuously from the upper end of the main body (40) in a direction outwardly of the frame proper (A) and further extends along the whole length of main body (40). As best seen in FIGS. 3 and 5, defined integrally between the lower end of main body (40) and the lower flange (42) is a reinforcing beam portion (43) of substantially U-shaped cross-section to add to reinforcement of the lateral frame portion (4) itself, excepting the forward end region of the lateral frame portion (4) inclusive of the cross beam portion (5). Generally stated, however, the lower flange (42) projects horizontally and continuously from the lower end of main body (40) in a direction inwardly of the frame proper (A) and extends along the whole length of the lateral frame section (4). As far as the shown embodiment is concerned, the specific formation of the lower flange (42) is such that, as viewed from FIG. 6, in the forward longitudinal region thereof, there are defined a pair of downwardly sloped regions (42R) (42R) at a juncture point with the cross beam portion (5) in such a manner that the sloped regions (42R) are situated on the opposite sides of the cross beam portion (5), and that the forward region of the lower flange (42) on the left side of the beam portion (5) is directly and integrally connected with the vertical main body (40) and devoid of the reinforcing beam portion (43). Naturally, the flange (42) has a discontinued area at that juncture point where one end (5E) of the cross beam portion (5) is integrally connected with the left lateral frame portion (4).

Likewise as above, also defined integrally in the right lateral frame portion (3) are a vertical main body (30), an outwardly projected upper flange (31) and an inwardly projected lower flange (32). The upper flange (31) projects horizontally and continuous from the upper end of the main body (30) in a direction outwardly of the frame proper (A) and further extends along the whole length of main body (30). As understandable from FIG. 3, defined integrally between the lower end of main body (30) and the lower flange (32) is another reinforcing beam portion (33) of substantially U-shaped cross-section to add to reinforcement of the right lateral frame section (3) proper, excepting the forward end region of the lateral frame section (3) inclusive of the cross beam portion (5). But, in general, the lower flange (32) projects horizontally and continuously from the lower end of the vertical main body (30) in a direction inwardly of the frame proper (A) and extends along the whole length of the lateral frame section (3). Referring to FIG. 7, this lower flange (32) is, likewise as in the previously described one (42), formed with a pair of downwardly sloped regions (32R) (32R) at a juncture point with the cross beam portion (5) in such a manner that the sloped regions (32R) are situated on the opposite sides of the cross beam portion (5) and that the forward region of the lower flange (32) on the right side of the beam portion (5) is directly and integrally connected with the vertical main body (30) and devoid of the reinforcing beam portion (35). Naturally, the lower flange (32) has a discontinued area at that juncture point where one end (5E) of the cross beam portion (5) is integrally connected with the right lateral frame portion (3).

As can be seen from FIGS. 1 and 3, a plurality of spring securing holes (43A) are formed in the left lower flange (42), and also, likewise formed in the right lower flange (32) are a plurality of spring securing holes (33A). Hence, plural support springs (S) (or typical sinuous springs) may be extended between the left and right lateral frame portions (4) (3) by engaging the end portions of springs (S) over the holes (43A) (33A), respectively.

The above-described left and right lateral frame portions (4) (3) are further formed, in their respective forward lower end areas, integrally with a pair of downwardly projecting thickened connecting portions (44) (34) at a juncture point with the cross beam portion (5). Designations (34H) and (44H) denote through-bores, each penetrating horizontally through the respective two connecting portions (34) (44) in the transversal directions thereof. As understandable from FIGS. 2 and 4, the two forward thickened connecting portions (44) (34) are each equal in width to the right and left reinforcing beam portions (43) (33), respectively, and have their respective outer lateral walls (44A) (34A) and inner lateral walls (44B) (34B). Both outer lateral walls (34A) (44A) expand downwardly and continous from the respective outer planar lateral walls of the two main bodies (30) (40) in a coplanar relation therewith.

As indicated by the two-dot chain lines in FIG. 2, a pair of slide rail devices (SL) may be securely connected to those two connecting portions (34) (44), respectively, by bolts (UB). Specifically, each slide rail device (SL) is of a known construction comprising a lower rail (L) to be fixed on a floor of vehicle (not shown) and an upper rail (U) slidably fitted via roller (UR) in the lower rail (L). As viewed from the FIG. 2, it is seen that a forwardly facing upper end of the left upper rail (U) may be firmly attached to the inward side wall (44B) of the left connecting portion (44) by inserting a bolt (UB) in the through-bore (44H) and then threadedly connecting the bolt (UB) and a nut (UN), whereas likewise, a forwardly facing end of the right upper rail (U) may be firmly attached to the inward side wall (34B) of the right connecting portion (34) by bolt (UB) and nut (UN) via the through-bore (34H). Alternatively, as suggested in FIG. 6, the through-bore (44H) may be formed vertically in the thickened connecting portions (44) such as to penetrate vertically therethrough. Likewise, though not shown, another same through-bore as the one (44H) may be formed vertically in the thickened connecting portion (34). This allows for use of a slide rail device (SL) of the type having an inverted-L-shaped upper rail (U'). That is, as indicated by the one-dot chain lines in FIG. 6, the horizontally bent end (U'1) of upper rail (U') may be firmly attached to the bottom of the connecting portion (44) by inserting a bolt (UB) from the opening (5G) into the through-hole (44H) and then threadedly engaging the bolt (UB) with a nut (UN) together with that particular end (U'1). It is therefore appreciated that the connecting portions (44) (34) are adaptable for connection with such different designs of upper slide rails via bolts and nuts or otherwise fastening means.

The above-described right and left lateral frame portions (3) (4) further has, defined in their respective rearward end areas, upwardly widened connecting regions (36) and (46) adapted for connection with respective two lower end portions of a seat back (not shown). Also, formed integrally in the rearward end areas of right and left lateral frame sections (3) (4) are downwardly projecting rearward thickened connecting portions (35) and (45), respectively, which are adapted for connection with the slide rail device (SL). As can be seen from FIG. 3, the left and right connecting portions (35) (45) are each integrally dependent from the respective left and right reinforcing beam portions (33) (43) such that the widths of the former are equal to the widths of the latter. Those two rearward connecting portions (35) (45) have their respective outer lateral walls (35A) (45A) and inner lateral walls (35B) (45B). Both outer lateral walls (35A) (45A) expand downwardly and continuous from the respective outer lateral walls of the two main bodies (30) (40) in a coplanar relation therewith. Similar to the connection with the afore-said connecting portions (34) (44), it is seen from both FIGS. 1 and 3 that a rearwardly facing end of the left upper rail (U) may be firmly attached to the inward side wall (45B) of left connecting portion (45) by inserting a bolt in the through-hole (45H) and threadedly connecting the bolt and a nut, and also, likewise, a rearwardly facing end of the right upper rail (U) be firmly attached to the inward side wall (35B) of the right connecting portion (35) by bolt and nut via the through-bore (35H). Alternatively, as suggested in FIG. 5, the though-bore (45H) may be formed vertically in the left thickened connecting portions (45) such as to vertically penetrate therethrough. Likewise, though not shown, another same through-bore as the one (45H) may be formed vertically in the right thickened connecting portion (35). This also allows for use of a slide rail device (SL) of the type having an inverted-L-shaped upper rail (U'). In this instance, as indicated by the one-dot chain lines in FIG. 5, the horizontally bent end (U'1) of upper rail (U') may be firmly attached to the bottom of the left connecting portion (45) by inserting a bolt (UB) from the recession of the reinforcing beam portion (43) into the through-hole (44H) and then threadedly engaging the bolt (UB) with a nut (UN) together with that particular end (U'1). The same goes for the right connecting portion (35), not to mention. Hence, likewise as in the foregoing forward connecting portions (44) (34), those two rearward connecting portions (45) (35) are also adaptable for connection with different designs of slide upper rails via bolts and nuts or other fastening means.

With regard to a pair of upper widened connecting regions (36) (46), they are shown in FIG. 1 as extending continuous and coplanar from the respective two main vertical portions (30) (40) in the upward direction to enlarge their areas and are therefore large height-wise relative to the main portions (30) (40). Those two upper connecting regions (36) (46) are also formed with their respective upper flanges (36-1) and (46-1), both of which extend continuous from the respective two upper flanges (31) and (41), for reinforcement purpose. As viewed from FIG. 1, such connecting regions (36) (46) are each formed with a pair of through-holes (36H) (36H) and a pair of through-holes (46H) (46H), respectively. Though not shown, by inserting and fastening bolts in those through-holes (36H, 46H) for instance, a seat back frame or a pair of reclining devices may be securely connected at the two lower end portions thereof to the two connecting regions (36) (46), respectively.

Integrally defined between the above-described two lateral frame portions (3) (4) are the forward and rearward frame portions (1) (2) as in FIG. 1. The forward frame portion (1) is also formed with upper and lower flanges (11) (12), each projecting in opposite directions relative to the vertical main body (10) thereof and extending continuous from the respective upper and lower flanges (41) (42) as well as from the respective upper and lower flanges (31) (32), as understandable from FIG. 1. On the other hand, the rearward frame portion (2) is only formed with a lower flange (21) in its vertical main body (20), wherein the lower flange (21) is shown as being continuous and integral with both two lower flanges (32) (42) respectively of left and right lateral frame sections (3) (4). The vertical main body (20) has a pair of lateral end portions (2E) (2E) which are each integrally connected with the respective rearwardly facing inward walls of left and right lateral frame portions (4) (3) (corresponding to the upper widened connecting portions (46) (36) respectively thereof). As best seen from FIG. 3, those two lateral end portions (2E) each has an integral downward region (2E-1) projecting downwards in coplanar relation therewith, and such two downward regions (2E-1) (2E-1) are each connected integrally with the two reinforcing beam portions (33) (43), respectively.

Figure 4:
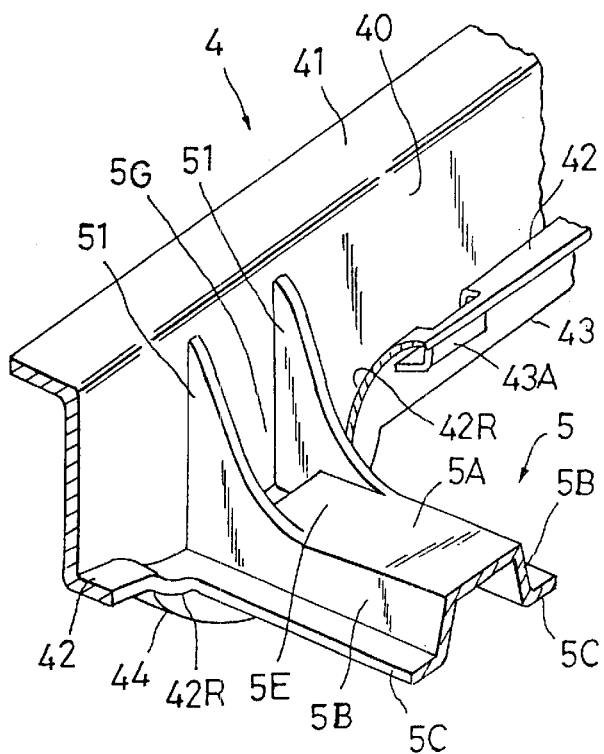
FIG. 4 is a partly broken enlarged view showing one principal area of the seat cushion frame where one end of a cross beam portion is integrally connected with a lateral frame portion.

Description will now be made of the cross beam portion (5), one of the principal parts of the present invention. Referring to FIG. 4, the cross beam portion (5) itself is of a channel cross-section which basically comprises a flat top wall (5A) and a pair of lateral vertical walls (5B) (5B). Generally stated, the cross beam portion (5) is so defined between the two lateral frame portions (4) (3) that the two end portions thereof are integrally connected with the latter, respectively, at the points where there lie the two forward thickened connecting portions (45) (35). More specifically, in the illustrated embodiment, the cross beam portion (5) has a pair of end portions (5E) (5E), each being integrally formed with a pair of gusset portions (51) (51) which are in turn integrally connected with the inward walls of left and right lateral frame portions (4) (3), respectively. Each end portion (5E) of the cross beam section (5) includes an inner vertical end wall portion (5E-1) and an outward horizontal portion (5E-2). Looking from FIG. 2, it is seen that the two inner vertical end wall portions (5E-1) (5E-1) of the cross beam end portion (5E) lie continuous and coplanar with the inward side walls (44B) (34B) respectively of left and right forward connecting portions (44) (34), while on the other hand, the two outward horizontal portions (5E-2) (5E-2) of the same end portion (5E) lie connected integrally with the inward walls respectively of the vertical main bodies (40) (30) of left and right lateral frame portions (4) (3).

Accordingly, an opening (5G) is defined among the those portions (5E-1) (5E-2) and the two gusset portions (51).

Further, the cross beam portions (5) has a pair of horizontal flanges (5C) (5C) projecting outwardly from the respective two ends of two lateral walls (5B) (5B) and also extending along the longitudinal directions of them. As best seen in FIGS. 6 and 7, the two horizontal flange portions (5C) (5C) terminate at one ends thereof in continuous connection with both two sloped flange portions (42R) (42R) of the left lateral frame section (4), while terminating, at another ends thereof, in continuous connection with both two sloped flange portions (32R) (32R) of the right lateral frame section (3).

As can be seen from FIGS. 1 and 2, the two lateral wall portions (5B) (5B) of cross beam section (5) are each formed with a downwardly arcuate region (5B-1) in the midway thereof. In other words, both lateral wall portions (5B) (5B) increase their areas downwardly in a progressive way from the ends to central region thereof in reference to the rectilinear line of upper flat wall portion (5A) such that a downward curve peak is created at the center of the lateral wall portions (5B) as clearly shown in FIG. 2. Hence, the central area of the cross beam section (5) is enlarged vertically, which means to not only enhance the robustness of whole cross beam section (5), but also provide a large vertical wall advantageous in receiving a seat occupant's buttocks portion which may be forwardly slipped on a seat cushion in a sudden deceleration or collision case.

From the descriptions above, it is to be appreciated that one die-cast seat cushion frame (A) of the present invention offers the following various remarkable advantages and effects:

(i) The integral formation of cross beam portion (5) in the frame (A) assures to provide an effective structural rigidity to the light and less robust body of frame (A) which is die cast from such light alloy material as magnesium or aluminum alloy. The cross beam section (5) is of a generally channel cross-section (i.e. inverted-U-shaped cross-section) having two vertical end wall portions (5E-1) and two horizontal flange portions (5C), thereby not only providing a thinnest possible structure effective in keeping the whole of frame (A) in a weight light state, but also providing a far increased robust and rigid structure against a great load applied thereto. Further, the vertically widened central region (5B-1) of cross beam section (5) adds to reinforcement of the cross beam section per se. Accordingly, the provision of cross beam section (5) suffices to reinforce the whole seat cushion frame (A) without need for increasing the thickness of the whole frame (A).

(ii) The cross beam section (5) is integrally connected, at its both ends, with the respective upper regions of two forward thickened connecting portions (44) (34), while being at its both ends integrally connected, via a pair of gusset portions (51), with the two lateral frame portions (4) (3), respectively. More specifically stated, in the cross beam section (5), both vertical and horizontal end portions (5E-1) (5E-2) thereof are integrally connected direct with the forward thickened connecting portions (44, 34), both vertical lateral walls (5B-1) thereof is integrally connected with the lateral frame portions (4, 3) via the vertically extending gusset portions (51), and the horizontal flanges (5C) thereof is integrally connected with the lateral frame portions (4, 3) via the horizontally extending sloped flanges (42R, 32R). Such plural vertical and horizontal integral connections make the cross beam portion (5) per se even more rigid against deformation due to a great load applied from the occupant's buttocks portion in a sudden deceleration or collision case, and also make the whole frame (A) robust against deformation due to a great moment or angular load applied thereto from the occupant's weight when a vehicle suddenly turns. Further, such integral connections of cross beam portion (5) with the lateral frame portions (3, 4) are collectively arranged at the points where the forward thickened connecting portions (44, 34) are disposed, whereby a great load applied to the cross beam section (5) is immediately dispersed in both thickened connecting portions (44) (34) and escaped smoothly therethrough to seat slide devices and thus down to a floor of vehicle. Yet further, the pair of spaced-apart gusset portions (51) define an opening (5G) therein, which contributes to reduction of the whole weight of frame (A) and allows for easy formation of the vertical through-bores (e.g. 44H) in the thickened connecting portions (44 and 34) as shown in FIG. 8.

(iii) The fact that the forward thickened connecting portions (44, 34) generally confines its width to that of the reinforcing beam portions (43, 33) and have their respective both vertical straight lateral walls (44A, 44B, 34A, 34B) coplanar with the outer straight vertical surfaces of lateral frame main bodies (40, 30), is of a great significance in providing a most possible robustness and minimum required thickness to the thickened portions (44, 34) themselves, contributing to improvement in lightweight yet rigid structure, and also in realizing a most efficient escape of a great load therethrough to a slide rail device (SL) dynamically. This is also true of the rearward thickened connecting portions (45, 35).

(iv) The provision of such dynamically designed robust cross beam portion (5) in the forward region of the frame (A) serves to receive a buttocks portion of a seat occupant which is forcibly thrust into a seat cushion and slipped forwardly thereon in a collision case or the like, thereby exhibiting additional effect to prevent the occupant from forward slippage or sliding on the seat cushion under inertia in a sudden deceleration. For that purpose, it is preferable to form the cross beam section (5) taller than a plane on which all the lower flanges (12, 21, 32, 42) lie, so that the occupant's buttocks portion will be positively caught and received by the cross beam section (5) in the deceleration or collision case.

(v) The lateral frame portions (3) (4) are also of reinforced and light structure because of their having the integral upper and lower horizontal flange portions (31, 41, 32, 42) as well as the integral U-shaped cross-section of reinforcing beam portions (33, 43).

While having described the present invention thus far, it should be understood that the invention is not limited to the illustrated embodiments, but any other modifications, replacements and additions may be structurally applied thereto without departing from the scopes of the appended claims.

What is claimed is:

1. An integrally formed die-cast seat cushion frame for a vehicle seat adapted for use in combination with a slide rail means comprising:

a forward frame portion defined at a forward side of said integrally formed die-cast seat cushion frame;

a rearward frame portion defined at a rearward side of said die-cast seat cushion frame;

a pair of lateral frame portions defined between said forward and rearward frame portions;

a pair of forward connecting portions integrally defined in said pair of lateral frame portions, respectively, so as to be disposed at a side near to said forward frame portion, said pair of forward connecting portions being adapted for connection to said slide rail means;

a pair of rearward integral connecting portions integrally defined in said pair of lateral frame portions, respectively, so as to be disposed at a side near to said rearward frame portion, said pair of rearward connecting portions being adapted for connection to said slide rail means; and a cross beam portion having a pair of ends and a generally inverted-U-shaped configuration in cross-section, including an upper horizontal wall and a pair of lateral vertical walls, said cross beam portion being integrally engaged between said pair of lateral frame portions at a point substantially corresponding to said pair of forward connecting portions.

2. The die-cast seat cushion frame as defined in claim 1, which is die cast from a light alloy material.

3. The die-cast seat cushion frame as defined in claim 2, wherein said light alloy material is selected from a group consisting of a magnesium alloy and an aluminum alloy.

4. The die-cast seat cushion frame as defined in claim 1, wherein said cross beam portion further includes a pair of integral flanges projecting outwardly and continuously from respective two ends of said pair of lateral vertical walls.

5. The die-cast seat cushion frame according to claim 1, wherein said cross beam portion comprises an upper wall and a pair of lateral vertical walls, and wherein each of said pair of lateral vertical walls is so formed to increase an area thereof vertically extending from both ends thereof to a midway region thereof.

6. The die-cast seat cushion frame according to claim 1, wherein each of said pair of vertical walls is so formed to increase an area thereof vertically extending from both ends thereof to a midway region thereof.

7. The die-cast seat cushion frame as defined in claim 1, wherein said pair of lateral frame portions have respective inner walls wherein each of said walls faces inward towards each other and wherein a generally U-shaped cross-section of reinforcing beam portion is provided integrally in said inner wall of each of said pair of lateral frame portions, extending along a longitudinal direction thereof.

8. The die-cast seat cushion frame as defined in claim 1, wherein said pair of lateral frame portions each has an outer vertical wall, wherein said at least two connecting portions are thicker relative to said pair of lateral frame sections and wherein, further, each of said at least two connecting portions is so formed to extend downwardly and continuously from the respective said pair of lateral frame sections and have an outer surface coplanar with said outer vertical wall of each of said pair of lateral frame sections.

9. The die-cast seat cushion frame as defined in claim 1, wherein one gusset portion is integrally defined between one of said ends of the cross beam portion and one of said pair of lateral frame portions while another gusset portion is integrally defined between the other end of the cross beam portion and another of said pair of lateral frame portions.

10. The die-cast seat cushion frame according to claim 9, wherein a first opening is formed in said one gusset portion to thereby define one pair of spaced-apart gusset portions therein, and a second opening is formed in said another gusset portion to thereby define another pair of spaced-apart gusset portions therein.

11. An integrally formed die-cast seat cushion frame for a vehicle seat adapted for use in combination with a slide rail means comprising:
a forward frame portion defined at a forward side of said integrally formed die-cast seat cushion frame;
a rearward frame portion defined at a rearward side of said die-cast seat cushion frame;
a pair of lateral frame portions defined between said forward and rearward frame portions;
wherein each of said pair of lateral frame portions has an integral upper flange projecting therefrom in a direction outwardly of the seat cushion frame and an integral lower flange projecting therefrom in a direction inwardly of the seat cushion frame;
a reinforcing beam portion of a generally U-shaped cross section defined between each of said pair of lateral frame portions and said integral lower flange;
at least two connecting portions formed integrally dependent from each of said pair of lateral frame sections and said reinforcing beam portion, wherein said at least two connecting portions each has a thickness generally equal to a width of said reinforcing beam portion and are adapted for connection with a slide rail means; and
a cross beam portion of a generally inverted-U-shaped configuration in cross-section, including an upper horizontal wall and a pair of lateral vertical walls, said cross beam portion being extended integrally between said pair of lateral frame portions at a point substantially corresponding to said pair of forward connecting portions.

12. The die-cast seat cushion frame as defined in claim 11, which is die cast from a light alloy material.

13. The die-cast seat cushion frame as defined in claim 12, wherein said light alloy material is selected from a group consisting of a magnesium alloy and an aluminum alloy.

14. The die-cast seat cushion frame as defined in claim 11, wherein a through-bore is formed in each of said at least two connecting portions such as to penetrate horizontally therethrough, adapted to allow said slide rail means to be securely attached to said at least two connecting portions by inserting and fixing a fastening means in said through-bore.

15. The die-cast seat cushion frame as defined in claim 11, wherein a through-bore is formed in each of said at least two connecting portions such as to penetrate vertically therethrough, adapted to allow said slide rail means to be securely attached to said at least two connecting portions by inserting and fixing a fastening means in said through-bore.

16. The die-cast seat cushion frame according to claim 11, wherein each of said pair of lateral vertical walls of said cross beam portion is so formed to increase an area thereof vertically extending from both ends thereof to a midway region thereof.

17. An integrally formed die-cast seat cushion frame for a vehicle seat adapted for use in combination with a slide rail means, comprising:
a forward frame portion defined at a forward side of said die-cast seat cushion frame, said forward frame portion having an integral upper flange projecting therefrom in a direction outwardly of the integrally formed seat cushion frame and an integral lower flange projecting therefrom in a direction inwardly of the seat cushion frame;
a rearward frame portion defined at a rearward side of said integrally die-cast seat cushion frame,
a pair of lateral frame portions integrally defined between said forward and rearward frame portions, said pair of lateral frame portions each including: an inward vertical wall facing inwardly of the die-cast seat cushion frame; an integral upper flange projecting therefrom in a direction outwardly of the seat cushion frame; and an integral lower flange projecting therefrom in a direction inwardly of the die-cast seat cushion frame, wherein both said integral upper and lower flanges extend along a longitudinal direction of said pair of lateral frame portions, wherein that the integral lower flange portion has a discontinuation therein;
said integral upper and lower flanges of said pair of lateral frame portions being connected integrally and continuously with said forward frame portion, respectively;
a pair of forward integral connecting portions integrally defined in said pair of lateral frame portions, respectively, so as to be disposed at a side near to said forward integral frame portion; said pair of forward integral connecting portions being adapted for connection with said slide rail means;

a pair of rearward integral connecting portions integrally defined in said pair of lateral frame portions, respectively, so as to be disposed at a side near to said rearward integral frame portion, said pair of rearward integral connecting portions being adapted for connection with said slide rail means; and a cross beam portion of a generally inverted-U-shaped configuration in cross-section including: an upper horizontal wall; a pair of lateral vertical walls; and a pair of integral flanges projecting outwardly and continuously from respective two ends of said pair of lateral vertical walls, said cross beam portion being extended integrally between the inward vertical wall of one of said pair of integral lateral frame portions and the inward vertical wall of another of said pair of integral lateral frame portions at a point substantially corresponding to said pair of forward integral connecting portions, wherein said pair of integral flanges each being integrally and continuously connected with said integral lower flange of each of said pair of lateral frame portions at said discontinued area.

18. The die-cast seat cushion frame as defined in claim 17, which is die cast from a light alloy material.

19. The die-cast seat cushion frame as defined in claim 18, wherein said light alloy material is selected from a group consisting of a magnesium alloy and an aluminum alloy.

20. The die-cast seat cushion frame as defined in claim 17, wherein one pair of spaced-apart gusset portions are integrally defined between one end of said cross beam portion and said inward vertical wall of said one of said pair of integral lateral frame portions at said side corresponding to said pair of forward integral connecting portions, whereas another pair of spaced-part gusset portions are integrally defined between another end of said cross beam portion and said inward vertical wall of said another of said pair of integral lateral frame portions at said side corresponding to said pair of forward integral connecting portions.

* * * * *